United States Patent [19]

Mistrot

[11] Patent Number: 5,847,691
[45] Date of Patent: *Dec. 8, 1998

[54] MICROKEYER FOR MICROCOMPUTER BROADCAST VIDEO OVERLAY OF A DC RESTORED EXTERNAL VIDEO SIGNAL WITH A COMPUTER'S DC RESTORED VIDEO SIGNAL

[76] Inventor: Henry B. Mistrot, 5206 S. Scout Island Cir., Austin, Tex. 78731

[ * ] Notice: The term of this patent shall not extend beyond the expiration date of Pat. No. 5,499,039.

[21] Appl. No.: 471,921

[22] Filed: Jun. 6, 1995

Related U.S. Application Data

[63] Continuation of Ser. No. 924,892, Aug. 4, 1992, Pat. No. 5,499,093, which is a continuation of Ser. No. 692,053, Jan. 15, 1985, which is a continuation of Ser. No. 336,679, Jan. 4, 1982, abandoned.

[51] Int. Cl.[6] .............................. H04N 5/16; H04N 5/262
[52] U.S. Cl. .......................... 345/115; 348/552; 348/588
[58] Field of Search .................................... 345/133, 115, 345/213; 348/510, 505, 584–592, 552, 588

[56] References Cited

U.S. PATENT DOCUMENTS

| | | | |
|---|---|---|---|
| 3,898,377 | 8/1975 | Fairbairn et al. ........................ | 348/584 |
| 4,136,359 | 1/1979 | Wozniak ................................. | 348/510 |
| 4,346,407 | 8/1982 | Baer et al. .............................. | 348/510 |
| 4,360,831 | 11/1982 | Kellar ..................................... | 348/585 |
| 4,388,620 | 6/1983 | Sherman ................................ | 345/133 |
| 4,425,581 | 1/1984 | Schweppe et al. ..................... | 348/510 |
| 4,631,588 | 12/1986 | Barnes et al. .......................... | 348/510 |
| 5,499,039 | 3/1996 | Mistrot .................................... | 345/115 |

Primary Examiner—Mark R. Powell
Attorney, Agent, or Firm—Kidd & Booth

[57] ABSTRACT

Broadcast standard format video signals such as that adopted by the National Television Standards Committee (NTSC) or the European standard format of Phase Alternating Line (PAL) and some broadcast "compatible" video signals are used as inputs to a microkeyer to synchronize a microcomputer's display in a manner that allows full and complete merging of the two signals (in particular, a computer's DC restored video signal with a DC restored external video signal) in the broadcast video domain by, for example, additive (mixing) or non-additive (keying) processes. The required synchronization (with horizontal and vertical drive components) in turn makes possible incorporation in any video space a variety of computer generated visuals such as illustrative graphics, titling and any other data displayed in the video. The merged video signal from this device may then be displayed on a television monitor, or transmitted, or received, or recorded by a video recorder or processed by a standard broadcast means for example. When applied to any common microcomputer display in its most fundamental form, no additional software is required.

24 Claims, 4 Drawing Sheets

MICROKEYER FOR MICROCOMPUTER BROADCAST VIDEO OVERLAY OF A DC RESTORED EXTERNAL VIDEO SIGNAL WITH A COMPUTER'S DC RESTORED VIDEO SIGNAL

This application is a continuation of application Ser. No. 07/924,892, filed on Aug. 4, 1992 (issued as U.S. Pat. No. 5,499,039 on Mar. 12, 1996), which is a continuation of application Ser. No. 06/692,053, filed on Jan. 15, 1985, which is a continuation of application Ser. No. 06/336,679, filed Jan. 4, 1982 (abandoned).

BRIEF SUMMARY

1. Field of the Invention

The present invention relates to the merging of two previously unrelated raster scan video signals. The present invention relates more particularly to the use of a microcomputer's raster scan video signal to be in a standard broadcast video format, such as NTSC, PAL, or other standard system, and then to merge the microcomputer's video with another standard broadcast video signal by various methods, including keying.

2. Background of the Invention

Microcomputers are used, for example, to generate graphics video in non-mergable formats.

Broadcast standard video formats such as that adopted by the National Television Standards Committee [NTSC], or the European standard, Phase Alternating Line [PAL] (hereinafter collectively referred to as NTSC), are extensively utilized for the transmission, recording and playback of real time activities.

The merging of computer graphics with an NTSC format video signal to get a single composite display has generally required considerable hardware, both cumbersome and expensive.

Computer overlay (merging) systems have been constructed, for example, in a manner allowing for external horizontal and vertical synchronization of the computer display to an NTSC composite sync signal or to individual horizontal and vertical drive signals from an external NTSC broadcast sync generator. The computer would then output individual red, blue and green signals which would in turn be connected to an external NTSC broadcast encoder (which would also be driven by the common broadcast sync generator) the output of which was a stable NTSC computer video signal. To then merge this NTSC computer video signal with another real time or recorded video signal, it has been necessary to feed the NTSC computer signal into a production switcher incorporating an additive mixing device for dissolve or a non-additive device for keying. Horizontal, vertical, and color synchronization of the two video signals has been required. In the case of the live camera NTSC video source, the camera's synchronization reference came from a broadcast NTSC sync generator which provided all system equipment with the required external drives. In the case of a prerecorded television signal, the playback device has, for example, been connected to an externally referenced time base corrector to bring the horizontal, vertical and color elements of the playback signal into synchronization with the common NTSC sync generator. Some devices such as titling generators would key only in black and white over an NTSC video input signal. Such devices are generally single purpose and do not incorporate a general purpose computer. The system of the present invention synchronizes and cleanly merges microcomputer generated color or black and white video with an externally generated stable or unstable, color or black and white video signal. In the preferred embodiment a reverse time base correction and keying is utilized. In this manner, synchronization and keying is accomplished without, for example, the cumbersome and expensive techniques previously described.

It is thus an object of the present invention to provide a method of video synchronizing and merging which will allow a broadcaster or cablecaster to overlay their video sources such as weather radar or camera visuals with related microkeyer generated graphics, text or data.

It is another object of the present invention to provide the medical field with a method to overlay the video surveillance of a patient with current vital statistics; or a means to overlay x-rays with pertinent data prior to viewing, transmission or recording.

It is another object of the present invention to provide the industrial control and monitoring technician with a method to overlay temperature, pressure, time, etc. over a video picture of a process for immediate viewing, transmission, and/or recording; with microcomputer process control available from the microkeyer.

It is another object of the present invention to provide a method in security systems to overlay a surveillance camera with area security status readouts for immediate viewing, recording, or transmission.

It is another object of the present invention to provide the instructional environment with a method to overlay a recorded or live instructional material with relevant computer appointments for purposes of clarification, instruction, and real time interaction with the student without the need for two display sources.

It is another object of the present invention to provide the sales environment with a method to overlay catalog or store visuals with current pricing, stocking, availability, etc.

It is another object of the present invention to provide a method wherein binary data may be placed into the active display picture area for purposes of video transmission, or recording.

It is an another object of the present invention to provide a method of synchronizing and merging video signals wherein binary data displayed on a microkeyer may be easily decoded by another microkeyer utilizing to fullest advantage the synchronous nature of the microkeyer.

SUMMARY OF THE INVENTION

In accordance with the present invention, a device and method is described which teaches how to capably and efficiently merge a microcomputer video display with a stable or unstable color video source in full color using reverse time base correction.

The system efficiently synchronizes and then merges, principally by, but not limited to, keying the video of a general purpose microcomputer having video display capability with another incoming video signal from a source such as a television camera, a demodulated television tuner, a video playback device, another similarly constructed microkeyer, or an internally generated color matte or black matte signal.

BRIEF DESCRIPTION OF THE DRAWINGS

A more complete appreciation of the invention and many of its attendant features may be had by reference to the following detailed descriptions when considered in connection with the accompanying drawings.

DETAILED DESCRIPTION OF THE INVENTION

Figure 1:
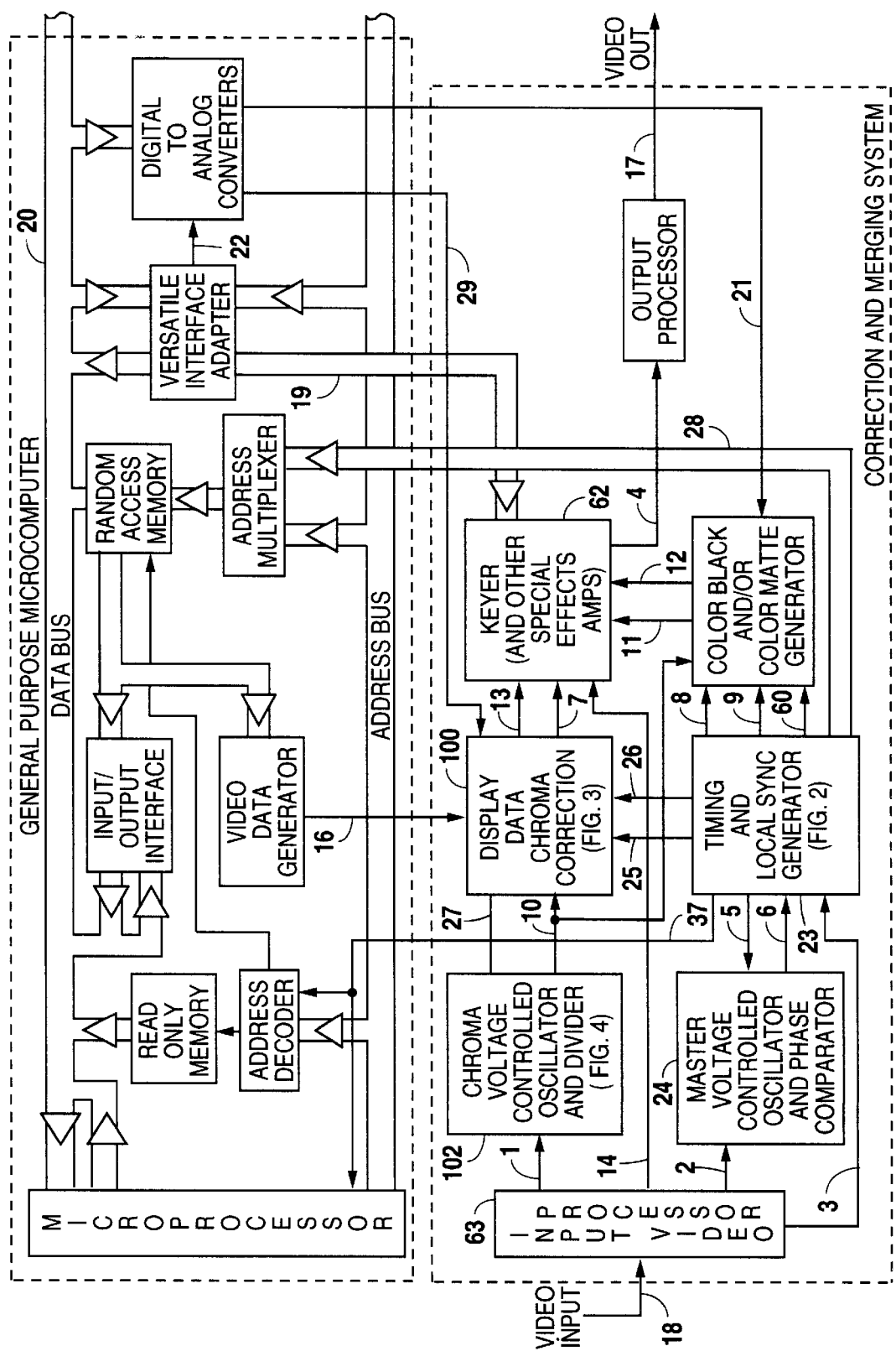
FIG. 1 is a block diagram of the microkeyer portion of the preferred embodiment of the apparatus of the present invention incorporated in a general purpose microcomputer.

A microkeyer system is disclosed which is particularly suitable for the efficient merging of microcomputer generated or controlled text and graphics with video from any traditional video source. Further, the described device, when incorporated as a modification to or as a peripheral device or as an accessory device in an existing microcomputer, requires no additional software to merge the computer's display video with the input video.

The essential components of a color microkeyer system are a general purpose microcomputer with a correction and merging system including an input video processor 63, a chroma voltage controlled oscillator and digital divider 102, a phase comparator 24, a display data chroma correction means 100, a timing and local sync generator 23 and a keyer 62. The general purpose microcomputer could be the Apple II computer manufactured by Apple Computer, Inc., Cupertino, Calif., as disclosed in U.S. Pat. No. 4,136,359 issued on the 23rd day of Jan. 1979, which patent is incorporated in this application by reference for all purposes. The timing and local sync generator 23 could be for example, the National MM5321 and the associated counters 32 and 33 and dividers 34, 36 (Fig.2); and the master voltage controlled oscillator 24 could be the Texas Instruments 74LS628. The basic operation, use and programming of the Apple II microcomputer is disclosed in the following publications each of which is incorporated in this application by reference: Apple II Basic Programming Manual published by Apple Computer, Inc., 10260 Bandley Drive, Cupertino, Calif. 95014, copyrighted in 1978, product number A2L0005X; The DOS Manual Disk Operating System, copyrighted in 1980 and published in 1981 by Apple Computer, Inc., 10260 Bandley Drive, Cupertino, Calif. 95014, product number A2L0036(030-0115- B) The Apple-Soft II Basic Programming Reference Manual, copyrighted in 1978, published by Apple Computer, Inc., 10260 Bandley Drive, Cupertino, Calif. 95014, product number A2L006 (030-0013-03) and The Apple II Reference Manual published in 1979 by Apple Computer, Inc., 10260 Bandley Drive, Cupertino, Calif. 95014, product number A2L0001A (030-0004-01).

Referring now to FIG. 1, video input (18) which usually consists of a video signal with luminance and chroma, color burst, and composite sync as per National Television Standards Committee standards, which standards are incorporated herein by reference, with which the computer graphics or text video is to be merged, enters input processor (63). Processor 63 is a suitable conventional input video processor which extracts and separates the individual reference horizontal (2) and vertical (3) synchronization drive components and color burst crossovers (1). Reference horizontal drive component (2) is phase compared, in a phase lock loop, with horizontal drive component (5) from timing and local sync generator (23) in order to phase lock the master VCO (24) to the horizontal sync of incoming video signal (18). In the present system, output 6 of the master VCO is for example 14.31818 MHZ (hereinafter referred to as 14.3 MHZ) and is provided to timing and local sync generator 23 where it is counted down (divided) to produce the necessary timing signals 25, 26, 28, 35 and 37 for the microprocessor, address decoder, and address multiplexer, and sync generator.

In the timing and local sync generator block (FIG. 2), a National MM5321 NTSC sync generator integrated circuit (31) for example is used to provide standard broadcast sync generator outputs. The counters in sync generator (31) become an integral part of phase lock loop (23 and 24). Sync generator (31) is locked to the horizontal component of input video signal (18). The master voltage controlled oscillator and phase comparator (24) locks the oscillator 14.3 MHZ output (6) in a manner to phase the local sync generator delayed horizontal drive (5) with the horizontal drive (2) derived from the input video (18) in the input video processor (63). The master VCO's 14.3 MHZ output (6) is divided by seven (34) to provide the required 2.04545 MHZ signal (35) for MM5321 local sync generator (31).

Sync generator 31 is a conventional integrated circuit element which provides horizontal drive (38), vertical drive (39), sync (8), blanking (9) and burst flag (60) standardized output signals which in the present invention, are phase locked to input video signal (18). Horizontal drive (38) is used to compare incoming and local signals in the phase locked loop of master VCO 24 and to reset horizontal address counters (32). Vertical drive (39) resets vertical address counters 33. Sync (8) is a composite NTSC sync pulse train which may be used to replace the sync signal in incoming video 18 if desired. Blanking signal (9) is used when it is desired to replace the timing and sync intervals in the input video signal with locally generated timing and sync intervals from the color black and/or matte generator VCA output processor in the manner as is known in the art. Burst flag (60) is a gating signal used to add a color burst to the locally generated sync signal (8) when blanking is active. Thus all output signals from sync generator (31) are provided and used in the conventional manner in lieu of those in input video signal 18.

Additionally, the 14.3 MHZ output (6) is divided (36) in a manner appropriate for a particular display and/or microprocessor's needs. In the preferred embodiment, timing circuit (36) divides the 14.3 MHZ output signals of 1.0227 MHZ, 2.045 MHZ, 3.579 MHZ and 7.159 MHZ, as is appropriate for use within Apple II microcomputer.

Delay circuit (106) is provided to permit adjustment of the processed output video sync interval with respect to the output video sync interval to compensate for system delay by adding delay (106) in the path of the horizontal drive signal (5) from sync generator (31) to master VCO (24).

Sync generator (31) receives a reset vertical synchronization drive component (3) from the input processor for vertical synchronization.

The display address counters (32 and 33) are suitable conventional display address counter circuits as are customarily used in raster scan graphics systems to provide memory addressing of the bits to be displayed.

Display memory addressing is accomplished by counters (32, 33) which are clocked by the counted down output (37)

from the master VCO (24). The horizontal and vertical display memory addressing counters are reset by the horizontal (38) and vertical (39) drive signals from the local sync generator (31).

By having the phase locked loop consisting of the timing (36) and local sync generator (31) and the display memory addressing (32 and 33) constructed in the above manner, the microcomputer's display data (16) will be phase locked to horizontal component, i.e., the reference horizontal drive (2), of incoming video signal (18). This insures that the luminance components of the two video signals are now locked together making it possible to merge black and white video signals cleanly but not necessarily color signals, particularly if the incoming color video signal (18) has an unstable horizontal time base or has a color burst that is not locked to a multiple of the horizontal component of its sync pulses, as is usually the case when the video source is a color playback device using a heterodyne or indirect color recovery process or the European phase alternating line, PAL, system, with a 25 HZ offset.

The next step to assure clean full color overlay (merging) of video signals (18 and 16) is chroma correction by insuring a color phase lock between the color component of the display data (16) and the color component of the incoming video signal (18), i.e., the incoming color burst. To do this, it is necessary to reverse time base correct the video display data (16).

Figure 2:
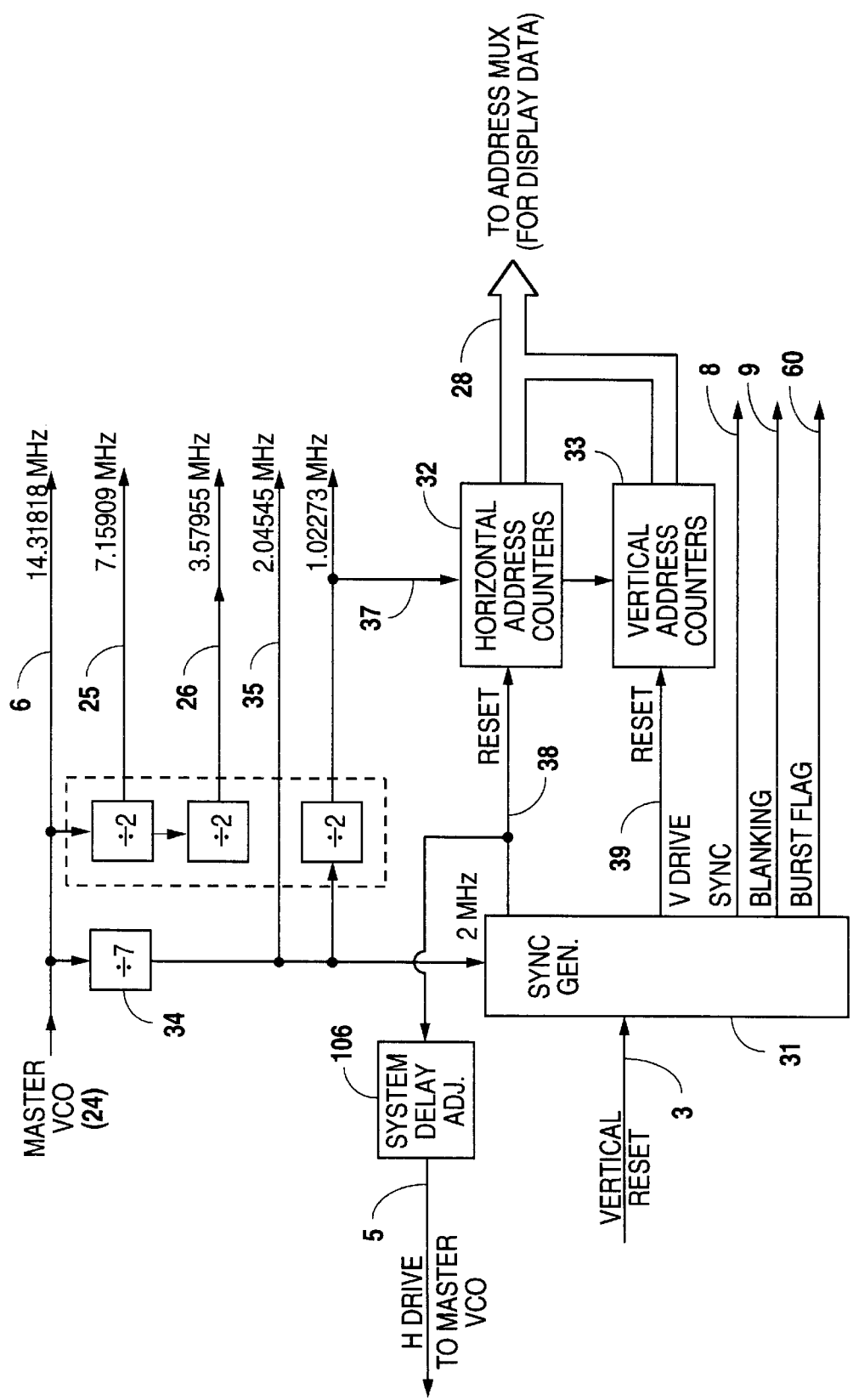
FIG. 2 is a detailed block diagram of the luminance timing and local sync generator portion of the preferred embodiment of the apparatus of the present invention.
Figure 3:
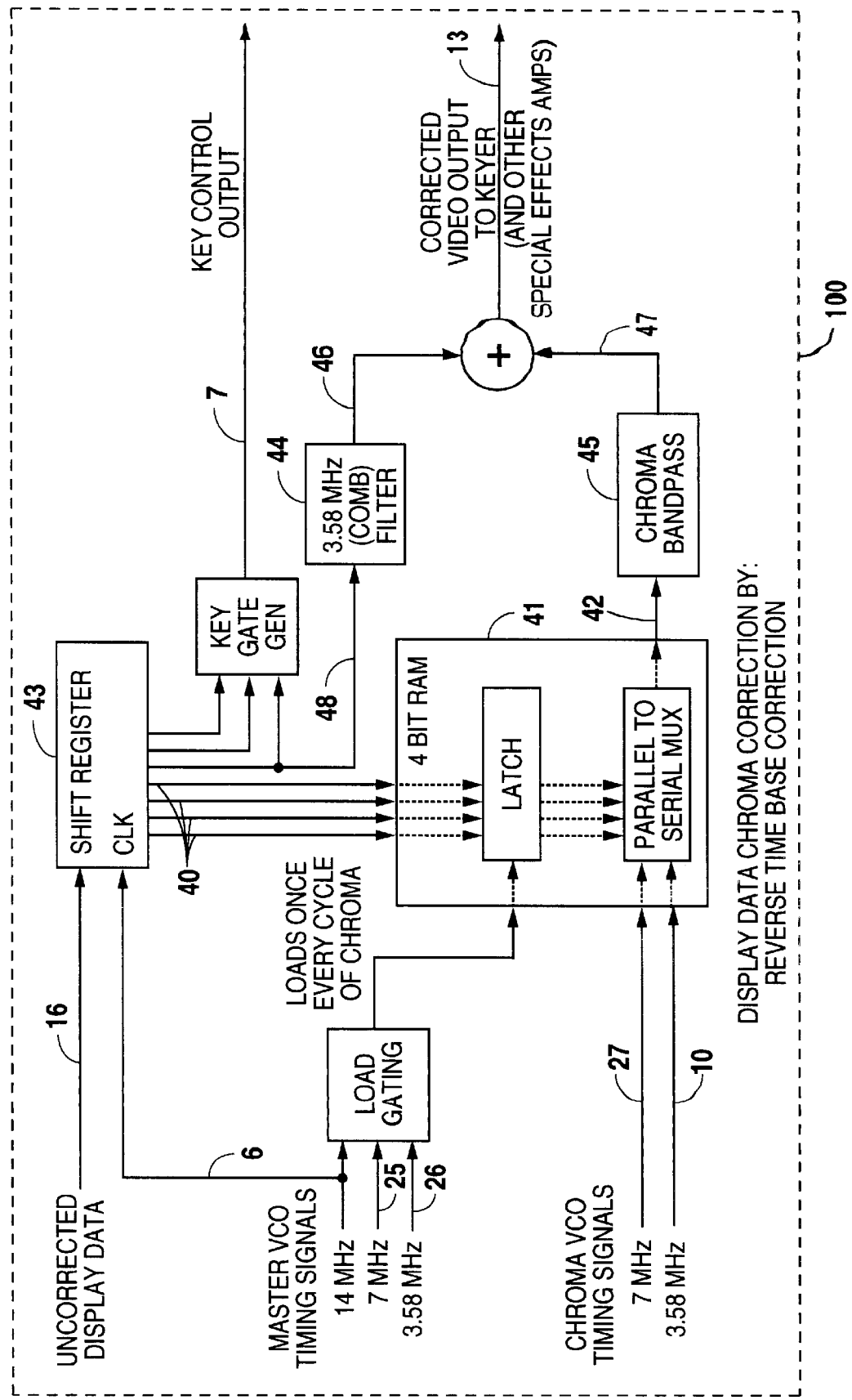
FIG. 3 is a detailed block diagram of the display data correction circuit portion of the preferred embodiment of the apparatus of the present invention.
Figure 4:
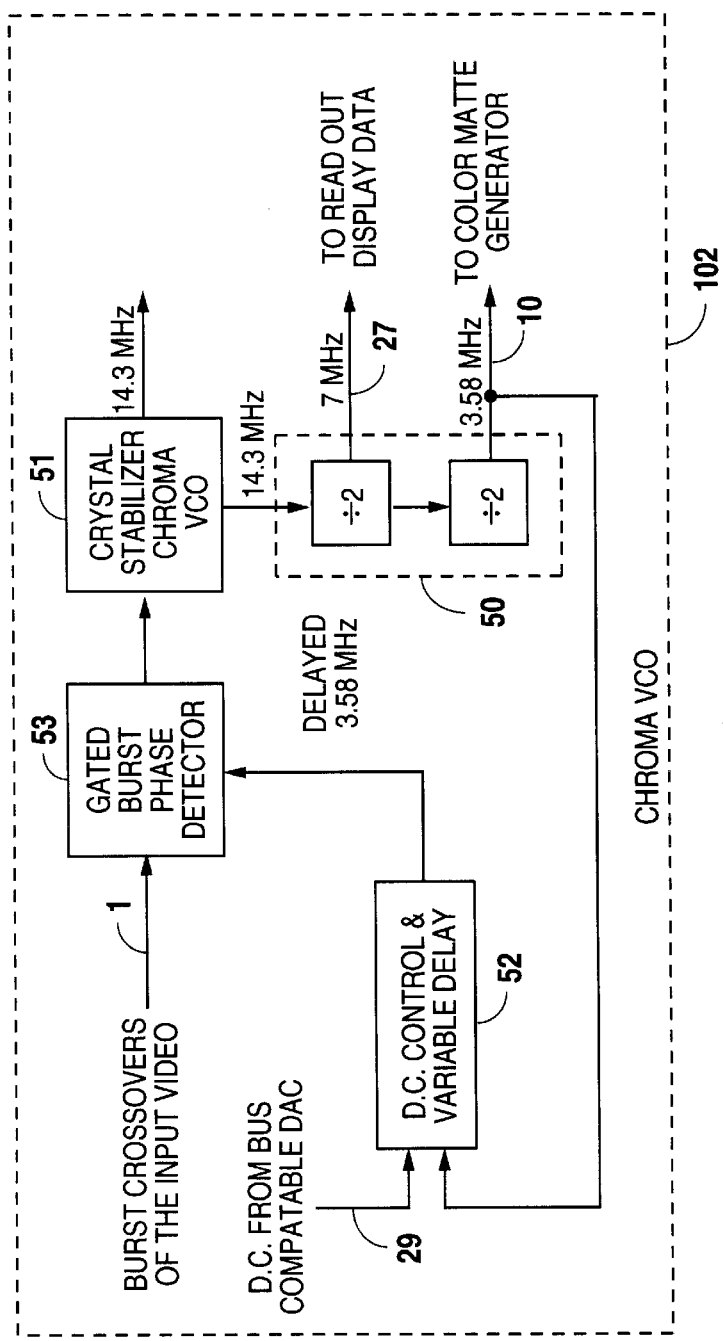
FIG. 4 is a detailed block diagram of the chroma VCO portion of the preferred embodiment of the apparatus of the present invention.

Referring to FIG. 3, in the presently preferred embodiment, the display data (16) bits produce 3.579545 MHZ (hereinafter referred to as 3.58 MHZ) components that produce color on a monitor or television set. The display data bits (16) are first clocked into shift register (43) for serial to parallel conversion (40). By loading a full cycle of chroma data bits of the computer parallel display data (40) into a small high speed ram or buffer (41) and addressing (10 and 27) (reading) it out again in serial form (42) while phase locked to the incoming color burst by the chroma VCO FIG. 4, the 3.58 MHZ (color) component of the displayed data is also phase locked (42) to the color burst on the incoming video signal (18). Loading (writing or buffering) into memory is addressed by the dividers (36) as shown in FIG. 2. The reading from memory is addressed by a similar set of dividers (50) clocked by the chroma VCO (51) as shown in FIG.4.

The chroma VCO in the presently preferred embodiment is a crystal stabilized 14.3 MHZ voltage controlled oscillator (51) divided down to 3.58 MHZ (10) and phase locked to the color burst crossovers (1) of the input video signal (18) by the gated burst phase detector (53). The chroma VCO output frequencies required depend upon the resolution necessary to address the number of bits utilized by the raster scan system for one full cycle of subcarrier.

Additionally, a bus compatible digital to analog converter (DAC) is used to control (29) a variable delay (52) in the 3.58 MHZ line (10) prior to the phase comparison step (53) in order to correct or adjust the phase of the chroma VCO (51). This phase control of the chroma VCO makes possible software control of the hue of the color graphics generated by the microcomputer. The use of a counter 22 in the versatile interface adapter (VIA) such as that sold as #6522 by Rockwell (FIG. 1) makes it possible to change the hue of the color sets generated by the microcomputer several times within a single frame or picture by adjusting the phase of chroma VCO (51) (FIG. 4), thus allowing, in a simple direct manner, the use of more true colors in a single computer generated picture than the computer could otherwise generate.

In FIG. 3, the display data chroma correction circuit is illustrated. This circuit takes the uncorrected video output (10) from the microprocessor, such as the Apple II, and makes it fully compatible with NTSC or other prescribed standards via the chroma VCO (51) timing signals which are derived from the incoming video burst signal (FIG. 4).

Figure 5:
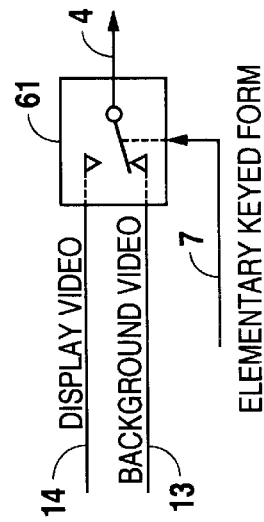
FIG. 5 is an elemental block diagram of a basic keyer portion of the preferred embodiment of the apparatus of the present invention.

It is necessary to remove the uncorrected 3.58 MHZ chroma components from the delayed display memory data output stream (48) before a new analog signal the display data luminance (46), can be formed. This data luminance signal (46) is essentially the uncorrected video display signal which has been phase locked to the incoming video horizontal sync but without the chroma components. The output (42) of the chroma correction ram (41) must be band passed (45) about 3.58 MHZ to remove any residual luminance components before another new analog signal, the display data chromanance (47) can be formed. Output signal (42) is essentially a reformatted chromanance signal which is phase locked to input video color burst and which is then filtered by chroma bandpass 45 to eliminate any residual luminance signal. The display data luminance (46) and chromanance (47) signals are then separately generated and simultaneously mixed to produce an NTSC color signal (13) which is sent to the keying mechanism (61) FIG. 5.

In other raster scan color generation systems attempting to achieve NTSC color television compatibility, the process will still be basically the same. The data bits carrying the luminance information are low passed or combed 44 (of Fig.3) for their luminance components to isolate the display data luminance. The display data color component will be achieved by producing a signal that appears to the television receivers or monitors to be a 3.58 chroma signal. The color defining bits in the display memory will be used to phase modulate a 3.58 MHZ carrier oscillator which is locked to the incoming video signal's color burst crossover points.

The input video (18) is DC restored in the input video processor on line 14. Once the microcomputer's display data video (13) is fully locked to the incoming video (18), then keying and dissolving of the two separate video signals (13 and 14) are carried out in either a non-additive or additive manner. In the embodiment, the keying mechanism (FIG. 5), a single-pole double-throw electronic switch (61), can be for example the output of which (4) is connected to the computer display video signal (14) when, and only when, the key control output (7) is true, and is connected to the background video signal (13) when the key control output (7) is false.

As will be appreciated by those of ordinary skill in the art, more complex switching arrangements may be used to obtain superior cross-talk characteristics and many varied well known side effects.

Referring back to FIG. 1, the sync (8), blanking (9) and color burst flag (60) from the NTSC sync generator and the chroma VCO's 3.58 MHZ counter output (10) can be combined to form a color black signal, and with the addition of a phase shifted 3.58 MHZ signal added to a variable blanking signal, a color matte may be created. Either the color black (11) or the color matte (12) signals can be chosen by the VIA and their relevant variables 19 controlled with DC (21) from bus compatible digital to analog converters. These two signals (1 1 and 12) are particularly needed to provide background mattes or masking when no video input signal is present.

The output processor can be a single-pole double-throw electronic switch that can be used to put new sync and color burst on the output line (17).

An improved version of the microkeyer is possible in that when the active video display addressing includes the vertical interval it is possible to use the graphics mode to encode binary data into the vertical interval as well as the rest of the display area. The retrieval of such data is made trivial by the synchronous nature of the microkeyer in that the horizontal (32) and vertical (33) display address counters are used to select lines to be decoded and the individual bits are then clocked back into memory by 6, 25, 26 and 37 of FIG. 2.

Thus an efficient device has been disclosed to overlay an NTSC video source with text and graphics from a general purpose microcomputer. This unique consolidation of well known and novel techniques means provides stable black and white or full color overlay accomplished without the cumbersome, and expensive hardware employed in the prior art.

In the current embodiment the VIA or versatile interface adapter is a Rockwell 6522; the DACs or digital to analog converters are National model 0830.

What is claimed as the invention is:

1. A method of combining a computer's video signal with an external video signal using DC restoration and chroma correction of said video signals to form a color corrected video output signal, comprising the steps of:

generating a computer's video signal;

providing an external video signal;

correcting the chroma component to said external video signal and said computer's video signal;

DC restoring the luminance component to said external video signal and said computer's video signal;

synchronizing said external video signal and said computer's video signal; and combining said external video signal and said computer's video signal to form a color corrected video output signal.

2. The method of claim 1 further comprising the step of generating control signals comprising a vertical drive signal and generating a horizontal drive signal.

3. The method of claim 1 wherein said step of synchronizing said external video signal and said computer's video signal further comprises the steps of:

synchronizing said computer's video signal with a horizontal drive synchronization component and a vertical drive synchronization component of said external video signal; and phase locking said computer's video signal with said horizontal drive synchronization component of said external video signal.

4. The method of claim 1 wherein said step of combining said computer's video signal with said external video signal further comprises the steps of:

displaying automatically said computer's video signal in the absence of said external video signal; and displaying automatically said external video signal in the absence of said computer's video signal.

5. A program storage device readable by a computer, tangibly embodying a program of instructions executable by the computer to perform method steps for a method of combining a computer's video signal with an external video signal using DC restoration and chroma correction of said video signals to form a color corrected video output signal, said method steps comprising:

generating a computer's video signal;

providing an external video signal;

correcting the chroma component to said external video signal and said computer's video signal;

DC restoring the luminance component to said external video signal and said computer's video signal;

synchronizing said external video signal and said computer's video signal; and combining said external video signal and said computer's video signal to form a color corrected video output signal.

6. The program storage device of claim 5 further comprising the step of generating control signals comprising a vertical drive signal and generating a horizontal drive signal.

7. The program storage device of claim 5 wherein said step of synchronizing said external video signal and said computer's video signal further comprises the steps of:

synchronizing said computer's video signal with a horizontal drive synchronization component and a vertical drive synchronization component of said external video signal; and phase locking said computer's video signal with said horizontal drive synchronization component of said external video signal.

8. The program storage device of claim 5 wherein said step of combining said computer's video signal with said external video signal further comprises the steps of:

displaying automatically said computer's video signal in the absence of said external video signal; and displaying automatically said plurality of external video signal in the absence of said computer's video signal.

9. A system for combining a computer's video signal with an external video signal using DC restoration and chroma correction of said video signals to form a color corrected video output signal, comprising:

a computer's video signal;

an external video signal;

means for correcting the chroma component of said external video signal and said computer's video signal;

means for DC restoring the luminance component to said external video signal and said computer's video signal;

means for synchronizing said external video signal and said computer's video signal; and means for combining said external video signal and said computer's video signal to form a color corrected video output signal.

10. The system of claim 9 further comprising means for generating control signals comprising a vertical drive signal and means for generating a horizontal drive signal.

11. The system of claim 9 wherein said means for synchronizing said external video signal and said computer's video signal further comprises:

means for synchronizing said computer's video signal with a horizontal drive synchronization component and a vertical drive synchronization component of said external video signal; and means for phase locking said computer's video signal with said horizontal drive synchronization component of said external video signal.

12. The system of claim 9 wherein said means for combining said computer's video signal with said external video signal further comprises:

means for displaying automatically said computer's video signal in the absence of said external video signal; and means for displaying automatically said external video signal in the absence of said computer's video signal.

13. Apparatus for combining a computer's video signal with an external video signal using DC restoration and chroma correction of said video signals to form a color corrected video output signal, comprising:

a computer's video signal;

an external video signal;

chroma correction of the chroma component of said external video signal and said computer's video signal;

DC restoration of the luminance component of said external video signal and said computers video signal;

synchronization of said external video signal with said computer's video signal; and combination of said external video signal and said computer's video signal to form a color corrected video output signal.

14. The apparatus of claim 13 further comprising control signals comprising a vertical drive signal and a horizontal drive signal.

15. The apparatus of claim 13 wherein said external video signal and said computer's video signal further comprises:

means for synchronizing said computer's video signal with a horizontal drive synchronization component and a vertical drive synchronization component of said external video signal; and said computer's video signal phase locked with said horizontal drive synchronization component of said external video signal.

16. The apparatus of claim 13 wherein said means for combining said computer's video signal with said external video signal further comprises:

automatic display of said computer's video signal in the absence of said external video signal; and automatic display of said external video signal in the absence of said computer's video signal.

17. The method of claim 1 wherein said step of synchronizing further comprises the step of phase locking the color component of said external video signal and said computer's video signal.

18. The method of claim 1 further comprising the step of controlling the color phase of said color corrected video output signal.

19. The program storage device of claim 5 wherein said step of synchronizing further comprises the step of phase locking the color component of said external video signal and said computer's video signal.

20. The program storage device of claim 5 further comprising the step of controlling the color phase of said color corrected video output signal.

21. The system of claim 9 wherein said means for synchronizing further comprises means for phase locking the color component of said external video signal and said computer's video signal.

22. The system of claim 9 further comprising means for controlling the color phase of said color corrected video output signal.

23. The apparatus of claim 13 wherein said synchronization loop further comprises a phase locked loop of the color component of said external video signal and said computer's video signal.

24. The apparatus of claim 13 further comprising phase control to control the color phase of said color corrected video output signal.

* * * * *